US012106429B2

(12) United States Patent
Suyama

(10) Patent No.: US 12,106,429 B2
(45) Date of Patent: Oct. 1, 2024

(54) IMAGE DISPLAY SYSTEM AND DISPLAY CONTROL METHOD FOR CONTROLLING A VIRTUAL LIGHTING DEVICE IN A VIRTUAL SPACE

(71) Applicant: Yamaha Corporation, Hamamatsu (JP)

(72) Inventor: Akihiko Suyama, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 59 days.

(21) Appl. No.: 17/685,051

(22) Filed: Mar. 2, 2022

(65) Prior Publication Data

US 2022/0284664 A1 Sep. 8, 2022

(30) Foreign Application Priority Data

Mar. 3, 2021 (JP) ................................. 2021-033897

(51) Int. Cl.
*G06T 15/50* (2011.01)
*G06F 3/16* (2006.01)
*G06T 15/20* (2011.01)
*H05B 47/105* (2020.01)

(52) U.S. Cl.
CPC ............ *G06T 15/506* (2013.01); *G06F 3/165* (2013.01); *G06T 15/20* (2013.01); *H05B 47/105* (2020.01)

(58) Field of Classification Search
None
See application file for complete search history.

(56) References Cited

U.S. PATENT DOCUMENTS

| 2018/0049287 A1 | 2/2018 | Lu et al. |
| 2019/0227419 A1* | 7/2019 | McNelley ............ H04N 9/3182 |
| 2020/0118342 A1* | 4/2020 | Varshney ................ G06T 13/20 |
| 2021/0074069 A1* | 3/2021 | Charlton ................ G06F 3/165 |

FOREIGN PATENT DOCUMENTS

| JP | 2005-341122 A | 12/2005 |
| JP | 2018-94326 A | 6/2018 |
| JP | 2020-9588 A | 1/2020 |

OTHER PUBLICATIONS

Partial European Search Report issued in European Application No. 22154973.6 dated Jul. 22, 2022 (13 pages).
Extended European Search Report issued in European Application No. 22154973.6 dated Oct. 27, 2022 (14 pages).
European Office Action issued in European Application No. 22 154 973.6 dated Sep. 15, 2023 (9 pages).

* cited by examiner

*Primary Examiner* — Ryan McCulley
(74) *Attorney, Agent, or Firm* — Crowell & Moring LLP

(57) ABSTRACT

An image display system includes an image information acquisition unit and a display control unit. The image information acquisition unit is configured to acquire image information. The display control unit is configured to display a virtual space in which a target image corresponding to the image information is displayed, and to control light to be emitted by a virtual lighting device provided in the virtual space based on state information indicating a state of a target space indicated in the target image.

13 Claims, 11 Drawing Sheets

FIG. 4

| | LIGHTING DEVICE INFORMATION | DISPLAY DEVICE INFORMATION | SPEAKER DEVICE INFORMATION |
|---|---|---|---|
| INSTALLATION POSITION | . . . | . . . | . . . |
| SIZE | | | |
| CONTROL PROTOCOL | | | |
| . . . | | | |

FIG. 5

| STATE INFORMATION IDENTIFICATION ID | INPUT SIGNAL | PROCESSING |
|---|---|---|
| 1 | LIGHTING SIGNAL | SELECT STAGE LIGHTING ACCORDING TO VIEWING POSITION OR THE LIKE IN VIRTUAL SPACE |
| 2 | IMAGE SIGNAL | EXTRACT REPRESENTATIVE COLOR FROM COLOR INFORMATION OF IMAGE |
| 3 | SOUND SIGNAL | EXTRACT FREQUENCY OF SOUND |
| 4 | HUMIDITY INFORMATION | HUMIDITY OF LIVE VENUE |
| 5 | SMELL INFORMATION | SMELL OF LIVE VENUE |
| 6 | TEMPERATURE INFORMATION | TEMPERATURE OF LIVE VENUE |
| ... | ... | ... |

IMAGE DISPLAY SYSTEM AND DISPLAY CONTROL METHOD FOR CONTROLLING A VIRTUAL LIGHTING DEVICE IN A VIRTUAL SPACE

CROSS-REFERENCE TO RELATED APPLICATIONS

This application is based on and claims priority under 35 USC 119 from Japanese Patent Application No. 2021-033897 filed on Mar. 3, 2021, the contents of which are incorporated herein by reference.

TECHNICAL FIELD

The present invention relates to an image display system, a display control method, and a light emission control method.

BACKGROUND ART

There is a system in which an image obtained by capturing a state of a live performance performed in a live venue is distributed to a device on a viewer side that is remote, and the image of the live performance is reproduced by the device on the viewer side. For example, Patent Literature 1 discloses a technique of controlling stage lighting provided in a live venue based on evaluation information transmitted from a viewer side to a distributor side. Patent Literature 2 discloses a technique of controlling a lighting device provided on a viewer side based on lighting information of a live venue.

CITATION LIST

Patent Literature

Patent Literature 1: JP-A-2020-9588
Patent Literature 2: JP-A-2005-341122

SUMMARY OF INVENTION

In such a system, there is a demand for a mechanism that causes a viewer who remotely views an image of a live performance to feel presence of the live performance.

The present invention has been made in view of such circumstances, and an object thereof is to provide an image display system, a display control method, a light emission control method and a program capable of causing a viewer who remotely views an image of a live performance to feel presence of the live performance.

In order to solve the above-mentioned problems, according to an aspect of the present invention, there is provided a display control method executed by a computer. The display control method includes acquiring image information by an image information acquisition unit; displaying, by a display control unit, a virtual space in which a target image corresponding to the image information is displayed; and controlling, by a display control unit, light to be emitted by a virtual lighting device provided in the virtual space based on state information indicating a state of a target space in the target image.

According to another aspect of the present invention, there is provided a light emission control method executed by a computer. The light emission control method includes acquiring image information by an image information acquisition unit; acquiring, by a position information acquisition unit, position information indicating a viewing position in a virtual space in which a target image corresponding to the image information is displayed; controlling, by a light emission control unit, light to be emitted by a lighting device based on the position information; and displaying, by a display control unit, the virtual space in which the target image is displayed based on the position information.

According to another aspect of the present invention, there is provided an image display system. The image display system includes an image information acquisition unit configured to acquire image information; and a display control unit configured to display a virtual space in which as target image corresponding to the image information is displayed, and control light to be emitted by a virtual lighting device provided in the virtual space based on state information indicating a state of a target space in the target image.

According to another aspect of the present invention, there is provided an image display system. The image display system includes an image information acquisition unit configured to acquire image information; a position information acquisition unit configured to acquire position information indicating a viewing position in a virtual space in which a target image corresponding to the image information is displayed; a light emission control unit configured to control light to be emitted by a lighting device based on the position information; and a display control unit configured to display virtual space in which the target image is displayed based on the position information.

According to the present invention, a viewer who remotely views an image of a live performance can feel presence of the live performance.

BRIEF DESCRIPTION OF DRAWINGS

FIG. 4 is a table showing an example of a configuration of connection information 520 according to the embodiment.

FIG. 5 is a table showing an example of a configuration of state information 521 according to the embodiment.

DESCRIPTION OF EMBODIMENTS

Hereinafter; an embodiment of the present invention will be described with reference to the drawings.

Figure 1:
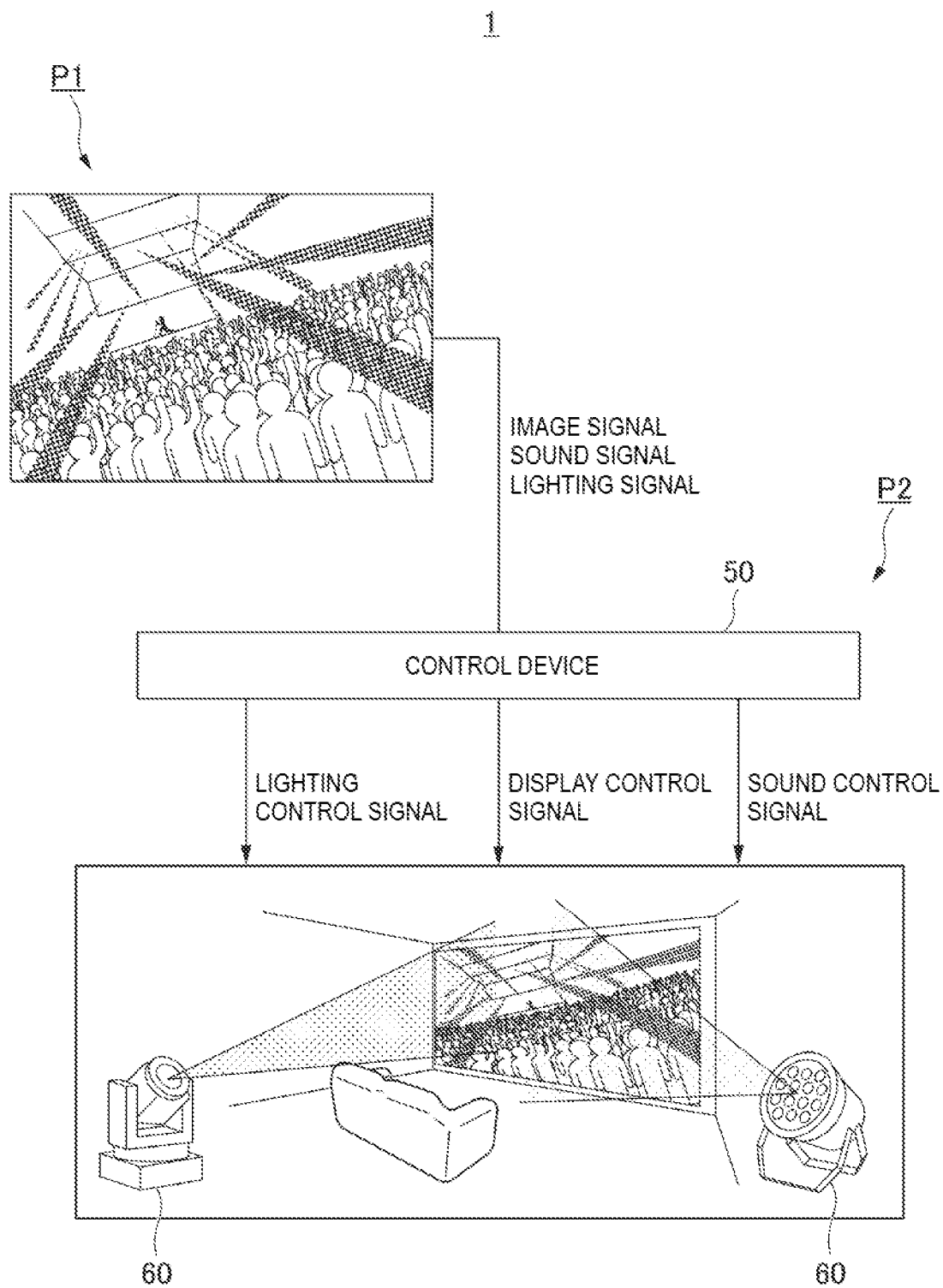
FIG. 1 is a diagram showing an overview of an image display system 1 according to art embodiment.

FIG. 1 is a diagram showing an overview of an image display system 1 according to an embodiment. The image display system 1 is a system that distributes a situation of a live performance being performed in a live venue P1 to a remote location P2. The remote location P2 is, for example, a home of a user remote from the live venue P1.

In the image display system 1, for example, an image signal, a sound signal, a lighting signal and the like in the live venue P1 are acquired as the situation of the live performance, and these signals are distributed to a control device 50. The image signal is, for example, a signal of an image indicating a video or the like captured in the live venue P1. The sound signal is, for example, a signal of sound indicating sound collected in the live venue P1. The lighting signal is, for example, a signal for controlling various kinds of stage lighting provided in the live venue P1.

In the image display system 1, the control device 50 is, for example, a computer device provided at the remote location P2. At the remote location P2, one or more lighting devices 60 controlled by the control device 50 are provided. For example, the lighting device 60 is arranged according to a configuration of the stage lighting in the live venue. Although it is not necessary for the lighting device 60 to completely match the configuration of the stage lighting in the live venue, it is desirable that the lighting device 60 has a configuration the same as the configuration of the stage lighting in the live venue as much as possible and can create a lighting effect the same as that of the live venue.

Figure 2:
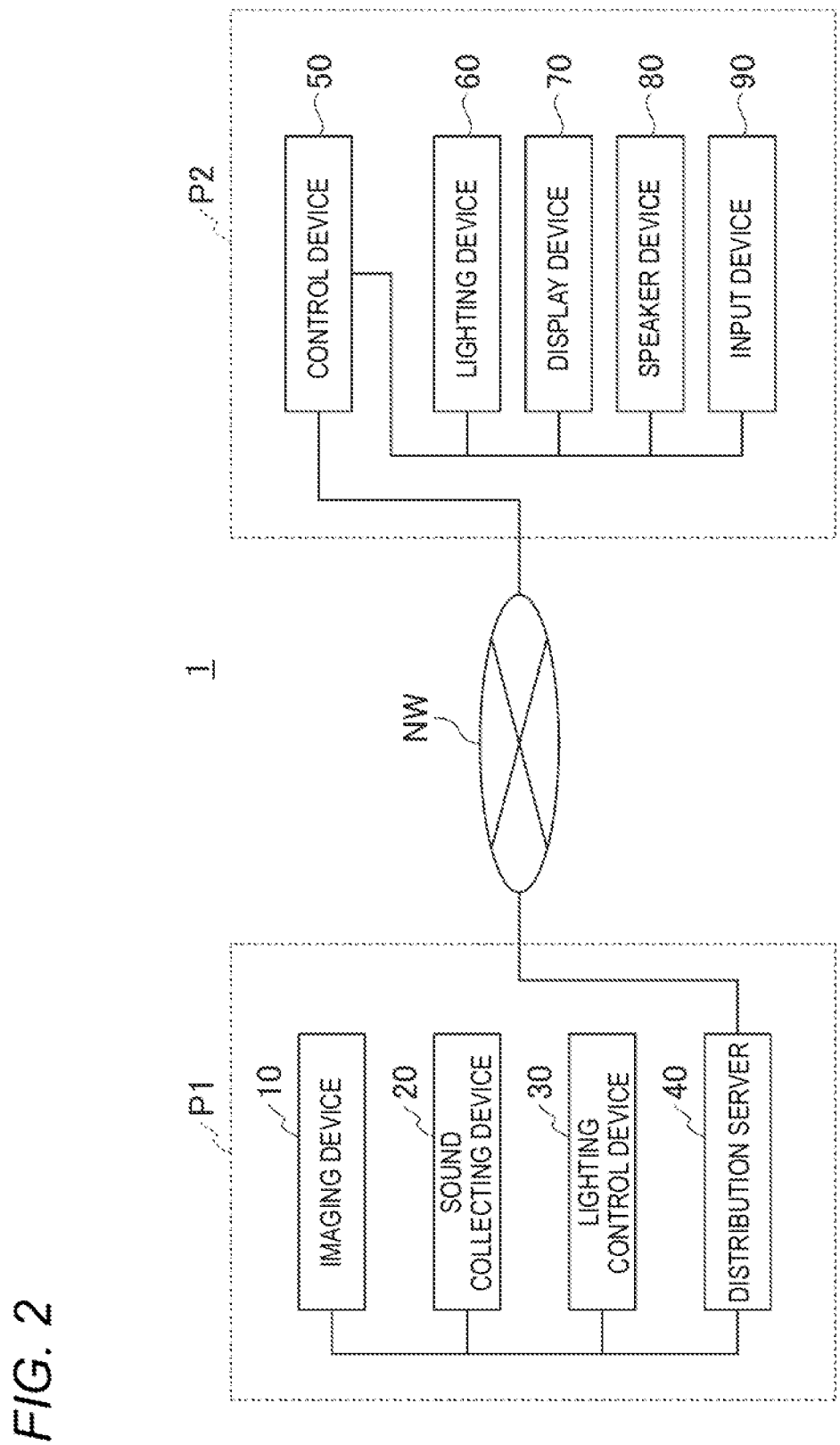
FIG. 2 is a block diagram showing an example of a configuration of the image display system 1 according to the embodiment.

The control device 50 receives the image signal, the sound signal and the lighting signal in the live venue P1. The control device 50 generates a lighting control signal, a display control signal and a sound control signal based on the received signals. The lighting control signal is a control signal for controlling light to be emitted by the lighting device 60 at the remote location P2, and is, for example, a digital multiplex 512 (DMX512) signal. The display control signal is a control signal for controlling an image to be displayed on a display device (a display device 70 in FIG. 2) at the remote location P2. The sound control signal is a control signal for controlling sound to be output from a speaker device (a speaker device 80 in FIG. 2) at the remote location P2. FIG. 2 is a block diagram showing an example of a configuration of the image display system 1 according to the embodiment. A specific method for generating the lighting control signal and the like by the control device 50 will be described in detail later.

The control device 50 outputs the generated lighting control signal to the lighting device 60. Thereby, the lighting device 60 emits the light according to the lighting control signal. The control device 50 outputs the generated display control signal to the display device 70. Thereby, the display device 70 displays the image corresponding to the display control signal. The control device 50 outputs the generated sound control signal to the speaker device 80. Thereby, the speaker device 80 outputs the sound corresponding to the sound control signal. Thereby, the image display system 1 can reproduce the situation of the live venue P1 at the remote location P2.

In the present embodiment, the control device 50 causes the display device 70 to display a virtual space. The virtual space is a virtual space simulating the live venue, and is, for example, a space in which a virtual screen or a virtual stage is provided at a center and virtual spectator seats are provided around the virtual screen or the virtual stage. The control device 50 displays, for example, the video captured in the live venue P1 on the screen provided in the virtual space. Examples of the display device 70 include a PC monitor and a head mounted display (abbreviated as HMD). Specific examples of the display device 70 include HoloLens (registered trademark) of Microsoft (registered trademark) ([searched on Jan. 28, 2021] with reference to the Internet <URL: https://www.microsoft.com/en-us/hololens>).

The control device 50 displays the virtual space according to a movement of the user or the like. Thereby, the user can view the live performance while freely moving in the virtual space. The control device 50 receives, from an input device (an input device 90 in FIG. 2) such as an HMD, an input signal indicating an actual line-of-sight direction of the user, the movement of the user viewing the screen displayed on the display device 70, or the like. The control device 50 changes a viewing position of the user in the virtual space and a line-of-sight direction of the user in the virtual space according to the received signal, and causes the display device 70 to display the virtual space viewed in the line-of-sight direction from the changed viewing position in real time. Thereby, the image display system 1 can display the image of the virtual space according to the viewing position and the line-of-sight direction in the virtual space freely selected by the user. Therefore, the user can experience the situation of the live performance as if the user freely walks around the live venue P1 and views the live venue P1 from various positions.

The control device 50 controls the light to be emitted by the lighting device 60 according to the viewing position of the user in the virtual space. For example, when the viewing position of the user in the virtual space is in front of the stage, the control device 50 controls the light to be emitted by the lighting device 60 using the lighting signal corresponding to the stage lighting provided on a stage upper portion (or a stage floor surface). For example, when the viewing position of the user in the virtual space moves to a side of the stage, the light to be emitted by the lighting device 60 is controlled by using the lighting signal corresponding to the stage lighting which irradiates a stage with light from the side of the stage. Thereby, the image display system 1 can control light emission of the lighting device 60 according to a movement of an actual line of sight or the like of the user. Therefore, the user can freely walk around the live venue P1 and feel lighting provided in the live venue P1.

The control device 50 controls the light to be emitted by the lighting device 60 according to state information indicating a state of a live space. The state information is information indicating the state of the live venue in which the user viewing the image or the like of the live performance at the remote location P2 feels presence of the live performance. The state information is, for example, a state of light that can stimulate human senses in the live venue. Alternatively, the state information is information indicating the sound in the live venue. The state information is, for example, information for controlling the stage lighting provided in the live venue, for example, a DMX512 signal. The state information may be information indicating a representative color representing a color of the image in which the situation of the live performance is captured. The state information may be information indicating a color corresponding to a frequency of the sound collected in the live space. The state information may be information indicating an environment of the live venue, for example, information indicating a humidity, a smell, a temperature and the like in the live venue (see FIG. 5).

Thereby, for example, when the lighting is turned off or a quiet ballad is played in the live venue, the control device 50 turns off lighting of the display device 70 to create a quiet atmosphere. When the lighting is turned on at once or a play is at a high volume in the live venue, the control device 50 makes the lighting of the display device 70 to be bright or to blink based on the state information, thereby creating an atmosphere in which the live performance is exciting. This enables the user to feel a sense of unity with the live venue P1.

When the play is at the high volume in the live venue, not only the lighting of the display device 70 may be made to be bright or to blink, but also a volume to be output from the speaker device 80 may be increased. In this case, for example, the control device 50 outputs a signal obtained by changing a volume or the like of the sound signal collected in the live space by an equalizer to the speaker device 80 as the sound control signal.

As described above, in the image display system 1, a live video can be viewed from various positions in the virtual space, and the light to be emitted by the lighting device 60 is controlled according to the viewing position and the state information in the virtual space. Thereby, in the image display system 1, the user can freely select the viewing position in the virtual space, and can feel the lighting provided in the live venue P1 according to the viewing position in the virtual space. Therefore, the user can experience the situation of the live performance from various positions as if the user freely walks around the live venue P1, and the light emission of the lighting device 60 changes according to the viewing position in the virtual space and a state of the live performance, whereby the use can experience the presence of the live performance better.

As shown in FIG. 2, the image display system 1 includes, for example, a device group on a live venue P1 side and a device group on a remote location P2 side. A distribution server 40 of the device group on the live venue P1 side and the control device 50 on the remote location P2 side are communicably connected to each other via, a communication network NW.

In the following, a case where the situation of the live performance is distributed in real time will be described as an example, but the present invention is not limited thereto. It is also possible to adopt a mode in which data or the like in which the situation of the live performance is recorded can be acquired on demand by using a file or the like. When the data is read using a file or the like, the control device 50 acquires the data from, for example, a memory (a storage unit 52 in FIG. 3 to be described later) provided in the control device 50. In this case, a communication function of the control device 50 (a communication unit 51 in FIG. 3 to be described later) may be omitted.

In the following, a case where the image signal, the sound signal and the lighting signal in the live venue P1 are distributed from one distribution server 40 will be described as an example, but the present invention is not limited thereto. The image signal, the sound signal and the lighting signal may be distributed from separate servers, or may be acquired in a file format.

The device group on the live venue P1 side is a device group that generates and distributes each of the image signal, the sound signal and the lighting signal in the live venue P1. The device group on the live venue P1 side includes, for example, an imaging device 10, a sound collecting device 20, a lighting control device 30 and the distribution server 40. The imaging device 10 captures the image of the live performance being performed in the live venue P1, and outputs a captured image signal to the distribution server 40. The sound collecting device 20 collects the sound in the live venue P1 and outputs a collected sound signal to the distribution server 40. The lighting control device 30 controls the lighting provided in the live venue P1 using the lighting signal, and outputs the lighting signal to the distribution server 40. The distribution server 40 transmits each of the image signal, the sound signal and the lighting signal generated in the live venue P1 to the control device 50.

For example, when the state information is information for controlling the stage lighting provided in the live venue P1, the state information is generated based on the lighting signal used by the lighting control device 30 for controlling the stage lighting. When the state information is information indicating the representative color representing the color of the image in which the situation of the live venue P1 is captured, the state information is generated based on the image signal of the image captured by the imaging device 10. When the state information is information indicating the color corresponding to the frequency of the sound collected in the live venue P1, the state information is generated based on the sound signal of the sound collected by the sound collecting device 20. When the state information is information indicating the environment of the live venue P1, the state information is generated based on the humidity, the smell, the temperature and the like measured in the live venue P1. In this case, information indicating the humidity, the smell, the temperature and the like measured in the live venue P1 is aggregated in the distribution server 40. The distribution server 40 transmits the information indicating the humidity, the smell, the temperature and the like measured in the live venue P1 to the control device 50. The state information may be generated in the live venue P1 or may be generated in the remote location P2. When the state information is generated in the live venue P1, for example, the imaging device 10 or the distribution server 40 generates the representative color of the image as the state information based on the image signal of the image in which the live venue P1 is captured. The distribution server 40 distributes the generated state information to the remote location P2. When the state information is generated in the remote location P2, the control device 50 receives the image signal of the image in which the live venue P1 is captured from the distribution server 40, and generates the representative color of the image as the state information based on the received information.

The device group on the remote location P2 side is a device group that reproduces the situation of the live performance at the remote location P2 using each of the image signal, the sound signal and the lighting signal in the live venue P1. The device group on the remote location P2 side includes, for example, the control device 50, the lighting device 60, the display device 70, the speaker device 80 and the input device 90. The control device 50 receives each of the image signal, the sound signal and the lighting signal generated in the live venue P1 from the distribution server 40. The control device 50 generates the lighting control signal, the display control signal and the sound control signal by using various signals received from the distribution server 40. The control device 50 outputs the lighting control signal to the lighting device 60. The lighting device 60 emits the light according to the lighting control signal. The control device 50 outputs the display control signal to the display device 70. The display device 70 displays the image corresponding to the display control signal. The control device 50 outputs the sound control signal to the speaker device 80. The speaker device 80 outputs the sound corresponding to the sound control signal. The input device 90 is attached to the user to detect the movement of the actual line of sight or the like of the user, and outputs a detection result to the control device 50 as input information. The control device 50 generates the display control signal indicating the virtual space viewed from the viewing position in the virtual space based on the input information, and outputs the generated display control signal to the display device 70. The control device 50 generates the lighting control signal based on the viewing position in the virtual space based on the input information, and outputs the generated lighting control signal to lighting device 60.

Figure 3:
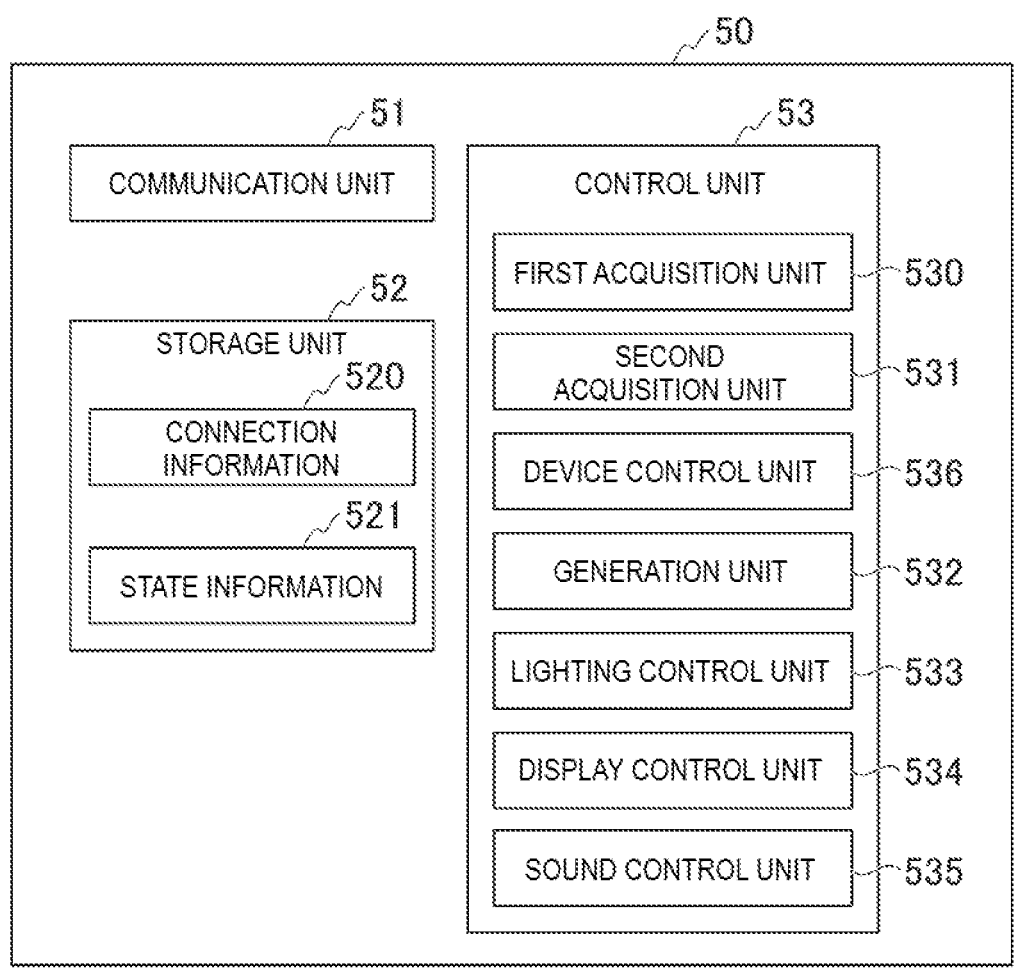
FIG. 3 is a block diagram showing, an example of a configuration of a control device 50 according to the embodiment.

FIG. 3 is a block diagram showing an example of a configuration of the control device 50 according to the embodiment. The control device 50 includes, for example, the communication unit 51, the storage unit 52 and a control unit 53.

The communication unit 51 is implemented by, for example, a general-purpose integrated circuit (IC) for communication. The communication unit 51 communicates with the distribution server 40 via the communication network. The communication unit 51 communicates with the lighting device 60, the display device 70, the speaker device 80 and the input device 90.

The storage unit 52 is implemented by, for example, a storage device such as a hard disk drive (HDD) or a flash memory (a storage device including a non-transitory storage medium), or a combination thereof. The storage unit 52 stores a program for implementing each component of the control device 50, variables used when the program is executed, and various types of information. The storage unit 52 stores, for example, connection information 520 and state information 521.

FIG. 4 is a table showing an example of a configuration of the connection information 520 according to the embodiment. The connection information 520 is information related to a device group connected to the control device 50, and includes items such as lighting device information, display device information and speaker device information. The lighting device information is information on a lighting device connected to the control device 50. The information on the lighting device is, for example, information indicating an installation position and a size of the lighting device, the number of lighting devices, a specification of each lighting device, a signal protocol of a control signal for controlling the lighting device, and the like. The display device information is information on a display device connected to the control device 50. The information on the display device is, for example, information indicating an installation position and a size of the display device, a specification of the display device, a signal protocol of a control signal for controlling the display device, and the like. The speaker device information is information on a speaker device connected to the control device 50. The information on the speaker device is, for example, information indicating an installation position and a size of the speaker device, the number of speaker devices, a specification of each speaker device, a signal protocol of a control signal for controlling the speaker device, and the like.

FIG. 5 is a table showing an example of a configuration of the state information 521 according to the embodiment. The state information 521 is generated based on distribution information distributed from the distribution server 40. The state information 521 is information indicating the state of the live space, and includes, for example, items such as a state information identification ID, an input signal and a state information generation means. The state information identification ID is identification information for identifying the state information.

The input signal is a signal used when generating the state information specified by the state information identification ID. For example, when the state information is generated using a lighting signal, the "lighting signal" is indicated as the input signal. When the state information is generated using an image signal, the "image signal" is indicated as the input signal. When the state information is generated using a sound signal, the "sound signal" is indicated as the input signal. When the state information is generated using a signal indicating the humidity, "humidity information" is indicated as the input signal. When the state information is generated using a signal indicating the smell. "smell information" is indicated as the input signal. When the state information is generated using a signal indicating the temperature, "temperature information" is indicated as the input signal.

The state information generation means is information indicating specific processing of generating the state information specified by the state information identification ID. The state information identification ID is information indicated in the leftmost item of the state information 521. For example, the state information specified by the state information identification ID (1) is generated by selecting the stage lighting according to the viewing position or the like in the virtual space. The state information specified by the state information identification ID (2) is generated by extracting the representative color from color information of the image. The state information specified by the state information identification ID (3) is generated by extracting the frequency of the sound. The state information specified by the state information identification ID (4) is generated using the humidity of the live venue. The state information specified by the state information identification ID (5) is generated using the smell of the live venue. The state information specified by the state information identification ID (6) is generated using the temperature of the live venue.

It should be noted that which state information is generated among a plurality of pieces of state information shown in an example of the state information 521 may be selected by an input operation of the user. In this case, the control device 50 displays a list of state information as shown in FIG. 5 on a display unit (not shown). The user operates, for example, an input device such as a mouse or a keyboard to designate which of the plurality of pieces of state information is to be generated.

When the lighting signal is not distributed or when the lighting signal is not embedded in the data distributed from the distribution server 40, the state information may be automatically generated. In this case, for example, what kind of state information is generated based on which signal (for example, a sound signal or an image signal) is designated by the input operation or the like of the user.

The present invention is not limited to a case where only one of the plurality of pieces of state information is selected, and the plurality of pieces of state information may be designated to be generated at the same time.

Returning to description of FIG. 3, the control unit 53 is configured to be implemented by, for example, a processor such as a central processing unit (CPU) or a digital signal processor (DSP) included in the control device 50 executing a program stored in the storage unit 52. Alternatively, all or some of the above-described components in the control device 50 may be implemented by dedicated hardware such as a large scale integration (LSI), an application specific integrated circuit (ASIC), or a field-programmable gate array (FPGA).

The control unit 53 includes, for example, a first acquisition unit 530, a second acquisition unit 531, a generation unit 532, a lighting control unit 533, a display control unit 534, a sound control unit 535 and a device control unit 536. The first acquisition unit 530 acquires distribution information. The distribution information is information indicating each of the image signal, the sound signal and the lighting signal in the live venue P1 transmitted from the distribution server 40 to the control device 50. The first acquisition unit 530 outputs the acquired distribution information to the generation unit 532, the display control unit 534 and the sound control unit 535.

The second acquisition unit 531 acquires input information. The input information is information that is output from the input device 90 to the control device 50 and that indicates the movement of the actual line of sight or the like of the user. The second acquisition unit 531 outputs the acquired input information to the generation unit 532 and the display control unit 534.

The generation unit 532 generates the state information 521 based on the distribution information distributed from the distribution server 40, and stores the generated information as the state information 521 of the storage unit 52. The generation unit 532 generates, for example, information indicating a state of light in the live venue as the state information 521. In this case, the generation unit 532 generates the state information 521 based on the lighting signal, for example. For example, the generation unit 532 sets, as the state information 521, a lighting signal of specific lighting of the stage lighting provided in the live venue, for example, the stage lighting in which a direction of light, an amount of light or the like changes with a movement of a person on the stage.

Alternatively, the generation unit 532 may extract information indicating a state of light in the live venue from an image signal, and may set a value corresponding to the extracted information as the state information 521. For example, the generation unit 532 determines a color (representative color) representing an image (target image) corresponding to the image signal based on color information of the image, and sets a value corresponding to the color information of the determined representative color as the state information 521. The generation unit 532 determines an RGB value of the representative color based on, for example, RGB values (an example of color information) of all pixels of the target image. For example, the generation unit 532 sets statistics such as an average value, a mode value, the maximum value and the minimum value in the RUB values of all the pixels as the RGB value of the representative color. Alternatively, the generation unit 532 may set a representative value of the RUB values of the pixels in a region obtained by dividing the target image into a plurality of regions as the RGB value of the representative color.

Alternatively, the generation unit 532 may extract information indicating sound in the live venue from a sound signal, and may set a value corresponding to the extracted information as the state information 521. The generation unit 532 sets, for example, information indicating a strength, a height or the like of the sound signal as the state information 521.

Specifically, the generation unit 532 calculates a signal intensity for each frequency of the sound constituting the sound signal, for example, by performing Fourier transform on the sound signal. The generation unit 532 sets, for example, a value corresponding to the largest signal intensity among all frequency bands constituting the sound as the state information 521. Alternatively, the generation unit 532 may set a value corresponding to the smallest frequency among all the frequency bands constituting the sound as the state information 521. The generation unit 532 may set a value corresponding to the largest frequency among all the frequency bands constituting the sound as the state information 521. In this case, for example, the generation unit 532 sets, as the state information 521, a value corresponding to which of a high frequency band, a medium frequency band and a low frequency band the largest frequency among all the frequency bands constituting the sound is. Alternatively, the generation unit 532 may set a value corresponding to a frequency of the largest signal intensity in all the frequency bands constituting the sound as the state information 521. The generation unit 532 may set, for example, a value corresponding to the maximum value of the sound signal in a predetermined time interval as the state information 521.

The generation unit 532 determines whether to control the lighting device 60 using the lighting information acquired from the first acquisition unit 530 or to control the lighting device 60 using the state information 521. For example, the generation unit 532 switches information for controlling the lighting device 60 to the lighting information or the state information 521 according to an operation input by the user. Alternatively, the generation unit 532 may set information obtained by mixing the lighting information or the state information 521 as the information for controlling the lighting device 60. The generation unit 532 outputs the information for controlling lighting device 60 to the lighting control unit 533.

The lighting control unit 533 acquires the information for controlling the lighting device 60 from the generation unit 532. The lighting control unit 533 generates a lighting control signal based on the information acquired from the generation unit 532, and outputs the generated signal to the lighting device 60. Thereby, the light emitted by the lighting device 60 is controlled. For example, the lighting control unit 533 generates the lighting control signal by converting the lighting signal of the specific stage lighting used for controlling the lighting device 60 in the distribution information into a control protocol of the lighting device 60 shown in the connection information 520 as necessary. The lighting control unit 533 outputs the generated lighting control signal to the lighting device 60. When converting a control protocol of the lighting signal, the lighting control unit 533 performs conversion based on, for example, information (the control protocol of the lighting device 60) stored in the connection information 520.

For example, the lighting control unit 533 acquires an input signal indicating a movement of an actual line of sight or the like of the user from the generation unit 532 as the information for controlling the lighting device 60. In this case, the lighting control unit 533 specifies a viewing position of the user in the virtual space based on the input information. The lighting control unit 533 changes the stage lighting used for controlling the lighting device 60 in the distribution information based on the specified viewing position and a line-of-sight direction in the virtual space. For example, the lighting control unit 533 selects the lighting signal of the stage lighting provided in vicinity of a position corresponding to the viewing position and the line-of-sight direction of the user in the virtual space in the live venue P1 as a signal used for controlling the lighting device 60. The lighting control unit 533 generates the lighting control signal by converting the selected lighting signal into the control protocol of the lighting device 60. The lighting control unit 533 outputs the generated lighting control signal to the lighting device 60.

In the above description, a case where the lighting control unit 533 controls the lighting device 60 using the input information acquired from the generation unit 532 has been described as an example. However, the present invention is not limited thereto. The lighting control unit 533 may control the lighting device 60 based on the state information 521 as described below instead of the input information.

The lighting control unit 533 acquires the state information 521 as the information for controlling the lighting device 60. In this case, the lighting control unit 533 generates a lighting control signal for emitting light of a color corresponding to the state information 521 using, for example, a color table in which the state information 521 and the color are associated with each other, and outputs the generated lighting control signal to the lighting device 60. The color table is stored in, for example, the connection information 520, and the lighting control unit 533 acquires the color table with reference to the connection information 520.

For example, a case where the state information 521 is a value corresponding to the representative color in the region obtained by dividing the target image into the plurality of regions is considered. In this case, for example, the lighting control unit 533 controls the lighting device 60 arranged on a right side using the state information 521 corresponding to the representative color in the region on a right side of the target image. The lighting control unit 533 controls the lighting device 60 arranged on a left side using the state information 521 corresponding to the representative color in the region on a left side of the target image. Thereby, light of a color the same as that on the right side (or the left side) in the virtual space is emitted on the right side (or the left side) in the real space, and it is possible to create an effect as if the virtual space and the real space are seamlessly spread. It is assumed that the virtual space in this case is a virtual space displayed on a monitor provided on a wall surface of a room or the like. That is, it is assumed that the virtual space is not a virtual space displayed on the HMD or the like.

The display control unit 534 generates a display control signal and outputs the generated signal to the display device 70 to control an image to be displayed on the display device 70. The display control unit 534 generates, for example, three-dimensional information of a virtual space including an image corresponding to an image signal in distribution information, for example, a virtual space indicating a live venue in which a live video is displayed on a screen, and generates the generated three-dimensional information as the display control signal. The display control unit 534 outputs the generated display control signal to the display device 70. For example, the display control unit 534 acquires the connection information 520 with reference to the storage unit 52. The display control unit 534 generates the three-dimensional information in the virtual space based on information such as a size of the monitor in the display device 70 indicated by the acquired connection information 520. For example, when the size of the monitor in the display device 70 is sufficiently large, the display control unit 534 generates three-dimensional information for displaying a virtual space in which a region of spectator seats is set to be wide, and creates a three-dimensional effect of the live venue P1. On the other hand, when the size of the monitor in the display device 70 is small, three-dimensional information for displaying a virtual space in which a main stage is the main (a region of spectator seats is narrow) is generated, and an effect that a performance on the stage is easily viewed is created. The three-dimensional data (for example, the three-dimensional data, indicating a position of the stage or a position of the lighting in the virtual space) (hereinafter, referred to as virtual space information) necessary for generating the virtual space is acquired as information different from the connection information 520 of the monitor. For example, the virtual space information may be distributed by the distribution server 40, the virtual space information may be embedded in a sound signal or an image signal, or the virtual space information may be acquired in advance by being embedded in a program.

The connection information 520 may be acquired by any method. For example, the distribution server 40 may distribute the connection information 520 corresponding to a viewing environment of the remote location P2, the connection information 520 may be embedded in a program in advance, or may be embedded in an image signal, a sound signal or the like and distributed.

When the display control unit 534 acquires an input signal indicating a movement of an actual line of sight or the like of the user, the display control unit 534 specifies a viewing position of the user in the virtual space based on the input information. The display control unit 534 generates, based on the specified viewing position in the virtual space, three-dimensional information of the virtual space in which the live venue viewed from the viewing position is indicated, and generates the generated three-dimensional information as a display control signal. The display control unit 534 outputs the generated display control signal to the display device 70.

The sound control unit 535 generates a sound control signal and outputs the generated signal to the speaker device 80, thereby controlling sound to be output from the speaker device 80. For example, the sound control unit 535 generates a lighting control signal by converting a sound signal in the distribution information into a control protocol of lighting device 60.

The sound control unit 535 acquires a viewing position of the user in the virtual space specified by the display control unit 534 from, for example, the display control unit 534. Based on the acquired viewing position in the virtual space, the sound control unit 535 generates sound of the live venue heard from the viewing position.

The device control unit 536 integrally controls the control device 50. For example, the device control unit 536 synchronizes time codes of a lighting signal, an image signal and a sound signal based on the distribution information distributed from the distribution server 40. As a method of synchronizing the time codes, any method of synchronizing the time codes, which has been performed in related-art, may be adopted. For example, the signals are synchronized using time codes embedded in the respective signals including the lighting signal, the image signal and the sound signal. The device control unit 536 outputs the synchronized lighting signal, image signal, and sound signal to the generation unit 532, the lighting control unit 533, the display control unit 534 and the sound control unit 535, respectively.

Figure 6:
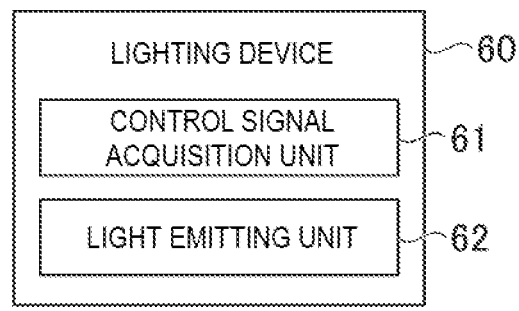
FIG. 6 is a block diagram showing an example of a configuration of a lighting device 60 according to the embodiment.

FIG. 6 is a block diagram showing an example of a configuration of the lighting device 60 according to the embodiment. The lighting device 60 includes, for example, a control signal acquisition unit 61 and a light emitting unit 62. The control signal acquisition unit 61 acquires a lighting control signal from the control device 50 and outputs the acquired signal to the light emitting unit 62. The light emitting unit 62 emits light according to the lighting control signal from the control signal acquisition unit 61.

Figure 7:
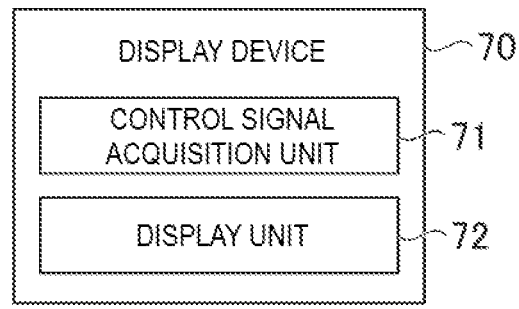
FIG. 7 is a block diagram showing an example of a configuration of a display device 70 according to the embodiment.

FIG. 7 is a block diagram showing an example of a configuration of the display device 70 according to the embodiment. The display device 70 includes, for example, a control signal acquisition unit 71 and a display unit 72. The control signal acquisition unit 71 acquires a display control signal from the control device 50 and outputs the acquired signal to the display unit 72. The display unit 72 displays an image corresponding to the display control signal from the control signal acquisition unit 71.

Figure 8:
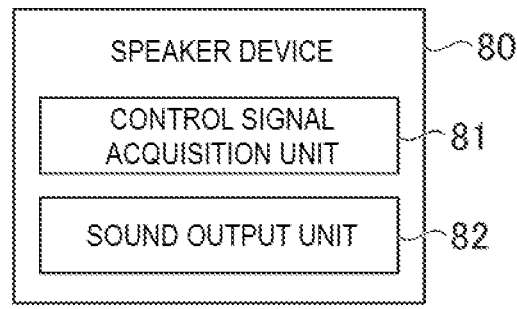
FIG. 8 is a block diagram showing an example of a configuration of a speaker device 80 according to the embodiment.

FIG. 8 is a block diagram showing an example of a configuration of the speaker device 80 according to the embodiment. The speaker device 80 includes, for example, a control signal acquisition unit 81 and a sound output unit 82. The control signal acquisition unit 81 acquires a sound control signal from the control device 50 and outputs the acquired signal to the sound output unit 82. The sound output unit 82 outputs sound corresponding to the sound control signal from the control signal acquisition unit 81.

Figure 9:
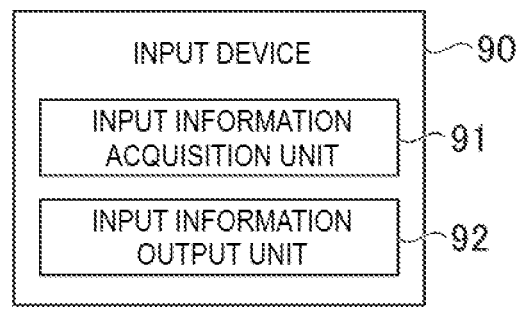
FIG. 9 is a block diagram showing an example of a configuration of an input device 90 according to the embodiment.

FIG. 9 is a block diagram showing an example of a configuration of the input device 90 according to the embodiment. The input device 90 includes, for example, an input information acquisition unit 91 and an input information output unit 92. Information indicating a movement of an actual line of sight or the like of the user is input to the input information acquisition unit 91. The input information output unit 92 outputs input information input to the input information acquisition unit 91 to the control device 50.

In the above description, a case where the input device 90 is the HMD and is a device that detects an actual line of sight, a movement of a head or the like of the user has been described as an example, but the present invention is not limited thereto. The input device 90 may be an input device such as a mouse, a keyboard, a game controller or a touch pad. In this case, when the user operates the mouse or the like, a line-of-sight direction or the like in the virtual space is operated, and the operated information is input to the input information acquisition unit 91. The input information output unit 92 outputs input information input to the input information acquisition unit 91 to the control device 50.

Figure 10:
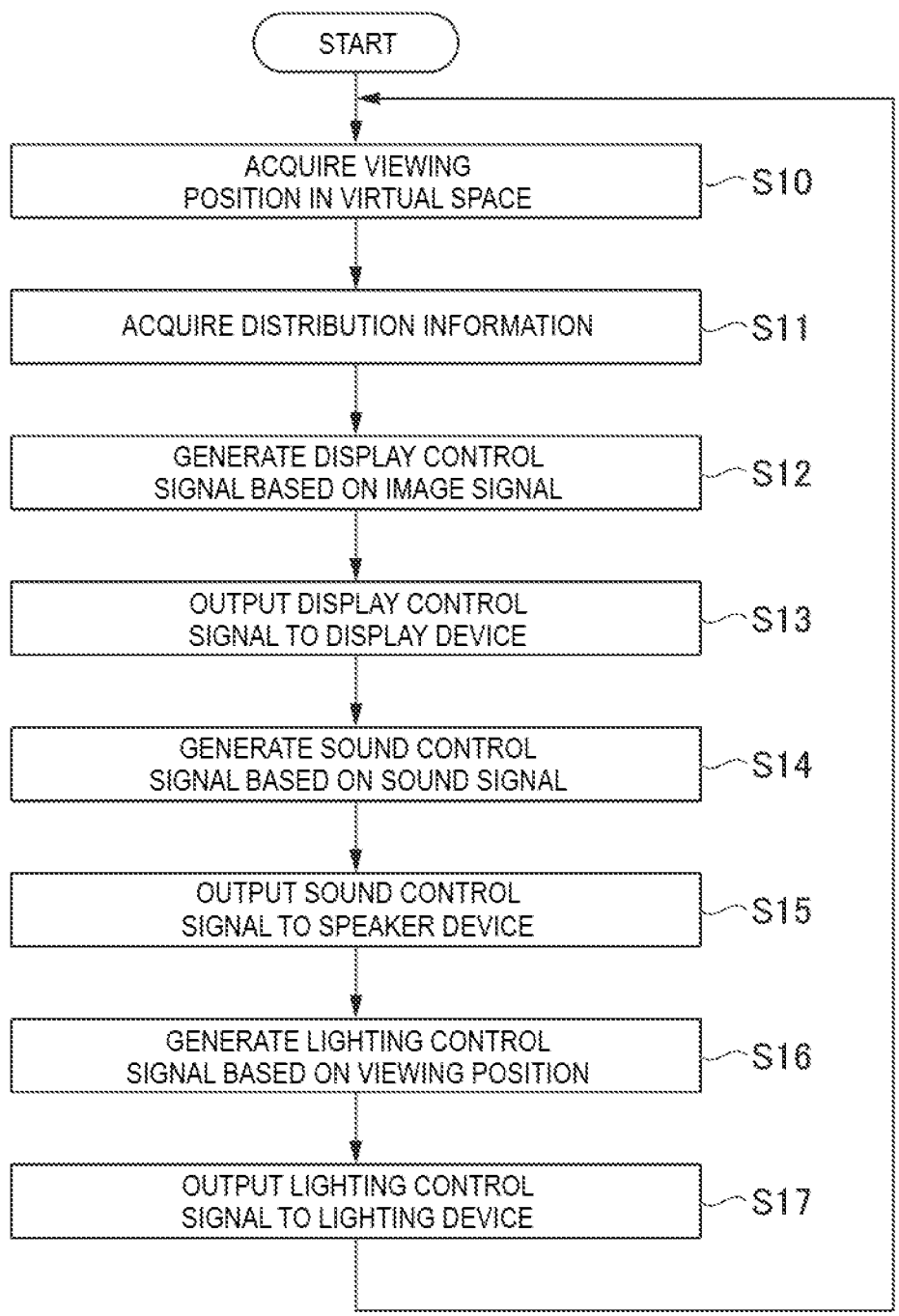
FIG. 10 is a flowchart showing a flow of processing executed by the control device 50 according to the embodiment.

FIG. 10 is a flowchart showing a flow of processing executed by the control device 50 according to the embodiment. The control device 50 acquires a viewing position of the user in the virtual space (step S10). The control device 50 determines the viewing position of the user in the virtual space according to an input signal from the input device 90. The control device 50 acquires distribution information (step S11). The control device 50 generates a display control signal based on an image signal in the distribution information (step S12). In this case, the control device 50 generates the display control signal such that an image corresponding to the viewing position is displayed on the display device 70. The control device 50 generates three-dimensional information of a virtual space simulating a live venue in which an image (live video) corresponding to the image signal is projected on a screen, and sets the generated three-dimensional information as the display control signal. The control device 50 outputs the generated display control signal to the display device 70 (step S13).

The control device 50 generates a sound control signal based on a sound signal in the distribution information (step S14). In this case, the control device 50 generates the sound control signal such that sound corresponding to the viewing position is output from the speaker device 80. The control device 50 outputs the generated sound control signal to the speaker device 80 (step S15). In this case, the control device 50 generates, for example, the sound control signal corresponding to the viewing position in the virtual space, and controls how to hear the sound according to the viewing position in the virtual space.

The control device 50 generates a lighting control signal based on the viewing position of the user in the virtual space (step S16). The control device 50 outputs the generated lighting control signal to the lighting device 60 (step S17). The control device 50 returns to the processing shown in step S10.

In the flowchart described above, sound output processing of outputting the sound of the speaker device 80 is executed after display processing of displaying the image on the display device 70, and then light emission processing of causing the lighting device 60 to emit light is executed. However, the present invention is not limited thereto. The display processing, the sound output processing and the light emission processing may be executed in any order. The display processing, the sound output processing and the light emission processing may be executed in parallel.

In the flowchart described above, the control device 50 may execute light emission processing (hereinafter, referred to as second light emission processing) based on the state information 521, in which light to be emitted by the lighting device 60 is controlled according to the state information 521. The second light emission processing may be executed in any order in the same manner as the display processing, the sound output processing and the light emission processing, or each processing may be executed in parallel.

As described above, the image display system 1 according to the embodiment includes the first acquisition unit 530, the display control unit 534 and the lighting control unit 533. The first acquisition unit 530 acquires image information. The image information is information indicating the image (target image) in which the situation of the live performance (viewing target) is captured. The first acquisition unit 530 is an example of an "image information acquisition unit". The display control unit 534 acquires position information. The position information is a position where the user views the target image in a virtual space. The virtual space is a virtual space in which the image (target image) in which the situation of the live performance (viewing target) is captured is displayed. The display control unit 534 is an example of a "position information acquisition unit". The lighting control unit 533 controls light to be emitted by the lighting device 60 based on the position information. The lighting control unit 533 is an example of a "light emission control unit".

Thereby, the image display system 1 according to the embodiment can provide the user with an experience as if the user walks around the virtual space simulating a live venue. A light emission state of the lighting device 60 can be changed according to the viewing position in the virtual space. Therefore, the user can feel presence of the live performance more strongly.

In the image display system 1 according to the embodiment, the lighting control unit 533 controls light emission of the lighting device 60 based on the state information 521. The state information 521 is information indicating a state of a live space (target space) in which the live performance (viewing target) is present. Thereby, the image display system 1 according to the embodiment can change the light emission state of the lighting device 60 according to a state of an effect by sound or light in the live venue. Therefore, the user can feel a sense of unity with the live performance.

The image display system 1 according to the embodiment further includes a sound control unit 535. The first acquisition unit 530 acquires sound information. The sound information is information indicating sound collected in the live space (target space) in which the live performance (viewing target) is present. The first acquisition unit 530 is an example of a "sound information acquisition unit". The sound control unit 535 controls the sound to be output from the speaker device 80 based on the sound information. The sound control unit 535 is an example of a "speaker control unit". Thereby, the image display system 1 according to the embodiment can cause the speaker device 80 to output the sound in the live venue. Therefore, an effect the same as the effect described above can be obtained, and the user can feel presence of the live performance more strongly. The sound output from the speaker device 80 may be changed according to the viewing position of the user in the virtual space. In this case, for example, the sound output from the speaker device 80 is moved or changed according to the viewing position by using a virtual effect such as a head-related transfer function (HTRF).

First Modification of Embodiment

Here, a first modification of the embodiment will be described. The present modification is different from the above-described embodiment in that a virtual lighting device (hereinafter, referred to as virtual lighting) is set in a virtual space.

When generating three-dimensional information corresponding to the virtual space, the display control unit 534 sets virtual lighting in the virtual space. For example, the display control unit 534 sets the virtual lighting as a light source in the virtual space. The virtual lighting is set as the light source of the virtual space, for example, according to a configuration of stage lighting in a live venue. Although it is not necessary for the virtual lighting to completely match the configuration of the stage lighting in the live venue, it is desirable that the virtual lighting has a configuration the same as the configuration of the stage lighting in the live venue as much as possible and can create a lighting effect the same as that in the live venue.

The display control unit 534 controls light to be emitted by the virtual lighting. For example, the display control unit 534 causes the virtual lighting to emit the light according to a lighting signal of the specific stage lighting corresponding to the virtual lighting in distribution information.

The display control unit 534 specifies a viewing position and a line-of-sight direction of the user in the virtual space based on input information, and changes an appearance of the entire virtual space based on the specified viewing position and line-of-sight direction. Lighting in the virtual space can be selected according to a predetermined correspondence rule. As a result, the appearance of the entire virtual space viewed by the viewer changes. The display control unit 534 causes the virtual lighting to emit the light according to the lighting signal of the selected stage lighting. In this case, the display control unit 534 acquires information indicating an arrangement position of the virtual lighting from, for example, the input device 90. Alternatively, the display control unit 534 may acquire the information indicating the arrangement position of the virtual lighting from information indicated in the connection information 520. In this case, in the connection information 520, an item related to the virtual lighting is provided, and information indicating an installation position of the virtual lighting is stored in the item.

For example, the display control unit 534 arranges the virtual lighting at a position the same as a position where the stage lighting of the live venue P1 is installed in the virtual space. The display control unit 534 associates the virtual lighting arranged in the virtual space with the stage lighting of the live venue P1, and controls light emission of the virtual lighting according to light emission of the stage lighting. Alternatively, the display control unit 534 may associate the stage lighting of the live venue P1 with the virtual lighting arranged in the virtual space in advance, and control the light emission of the virtual lighting according to the light emission of the stage lighting based on the association. In this case, when the virtual lighting arranged in the virtual space is arranged in the same manner as the stage lighting in the live venue P1, the virtual lighting and the stage lighting may be automatically associated with each other.

The display control unit 534 causes the virtual lighting to emit light of a color corresponding to the state information 521 by using, for example, a color table in which the state information 521 and the color are associated with each other.

Figure 11:
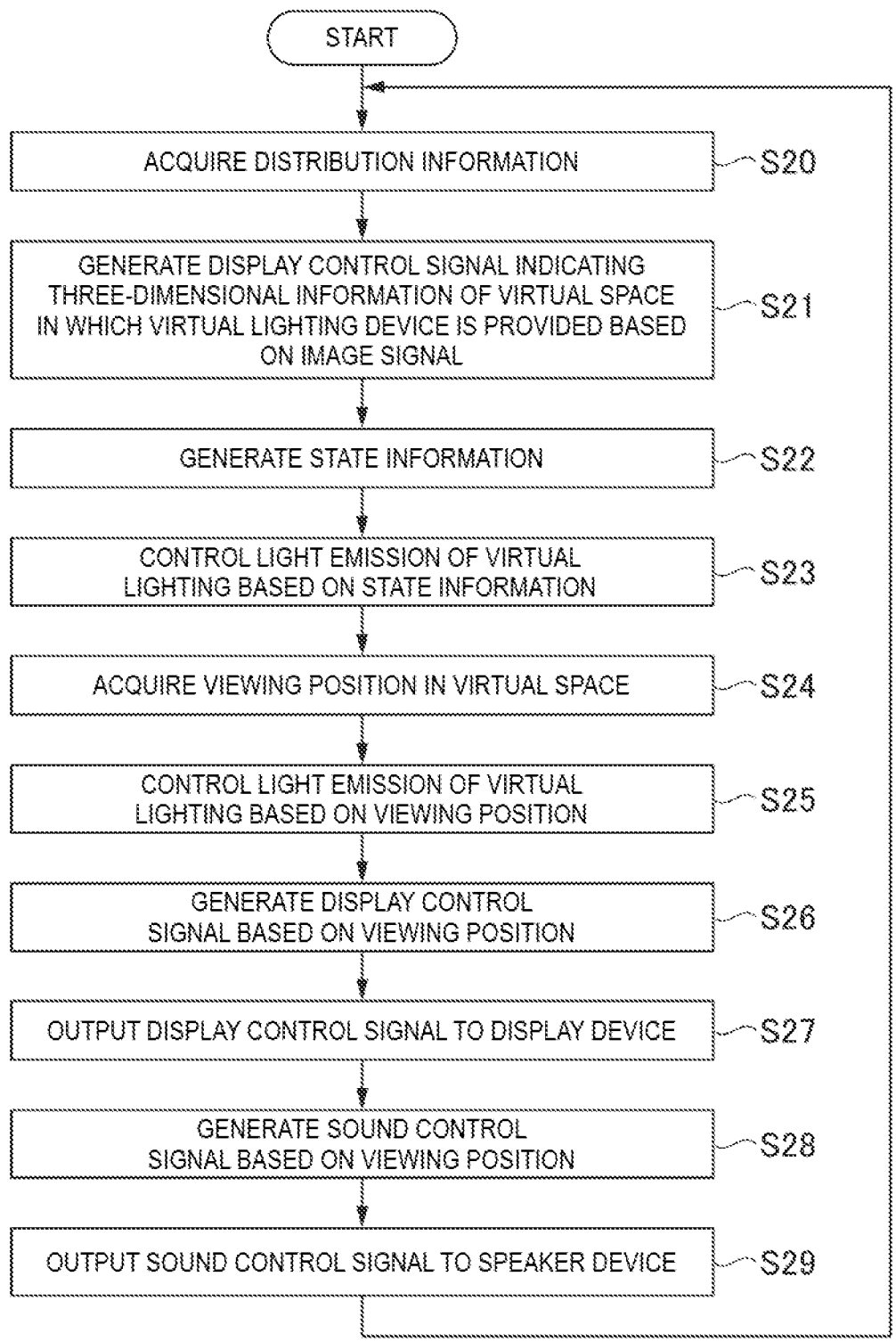
FIG. 11 is a flowchart showing a flow of processing executed by the control device 50 according to the embodiment.

FIG. 11 is a flowchart showing a flow of processing performed by the control device 50 according to the modification of the embodiment. The control device 50 acquires distribution information (step S20). The control device 50 generates three-dimensional information of a virtual space in which virtual lighting is set in a virtual live venue, based on an image signal in the distribution information (step S21). The generated three-dimensional information is output to the display device 70 as a display control signal (step S22).

The control device 50 generates the state information 521 based on the distribution information (step S22). The control device 50 generates, for example, information for controlling stage lighting provided in a live venue, such as a DUX signal as the state information 521. The control device 50 generates, for example, information indicating a representative color representing a color of an image (target image) in which a situation of a live performance is captured, as the state information 521. the control device 50 generates, for example, information indicating a color corresponding to a frequency of sound collected in a live space, as the state information 521. The control device 50 controls light emission of the virtual lighting based on the generated state information 521 (step S23).

The control device 50 acquires a viewing position of the user in the virtual space (step S24). The control device 50 controls the light emission of the virtual lighting according to the acquired viewing position (step S25). The control device 50 generates a display control signal according to the viewing position such that an image viewed from the viewing position is displayed on the display device 70 (step S26). The control device 50 outputs the generated display control signal to the display device 70 (step S27). The control device 50 generates a sound control signal according to the viewing position (step S28). The control device 50 outputs the generated sound control signal to the speaker device 80 (step S29). The control device 50 returns to the processing shown in step S20.

In the flowchart described above, as in FIG. 10, display processing, sound output processing, light emission processing (processing of causing the virtual lighting to emit light in FIG. 11), processing of controlling the light to be emitted by the virtual lighting according to the viewing position in the virtual space, processing of controlling the light to be displayed on the display device 70 according to the viewing position in the virtual space, and processing of controlling the sound to be output from the speaker device 80 according to the viewing position in the virtual space may be executed in any order. The above-described processing may be executed in parallel. Both the virtual lighting and the display device 70 (real lighting) may be controlled at the same time.

As described above, the image display system 1 according to the modification of the embodiment includes the first acquisition unit 530 and the display control unit 534. The first acquisition unit 530 acquires image information. The image information is information indicating the image (target image) in which the situation of the live performance (viewing target) is captured. The first acquisition unit 530 is an example of an "image information acquisition unit". The display control unit 534 displays the virtual space. The virtual space is a virtual space in which the image (target image) in which the situation of the live performance (viewing target) is captured is displayed. The display control unit 534 controls the light to be emitted by the virtual lighting (virtual lighting device) provided in the virtual space based on the state information 521. The state information 521 is, for example, information indicating a state of sound or light in the live space. The state information 521 is, for example, information for controlling the stage lighting provided in the live venue, such as the DMX signal. The state information 521 is information indicating the representative color representing the color of the image (target image) in which the situation of the live performance is captured. The state information 521 is information indicating the color corresponding to the frequency of the sound collected in the live space. Thereby, the image display system 1 according to the embodiment can change a light emission state of the virtual lighting according to a state of an effect by sound or light in the live venue. Therefore, an effect the same as the effect described above can be obtained, and the user can feel a sense of unity with the live performance.

In the above-described embodiment, a case where the DMX signal for controlling the stage lighting is distributed as the lighting signal from the distribution server 40 has been described as an example, but the present invention is not limited thereto. In general, in a lighting device, a command sequence of the DMX signal is different depending on the device. As a countermeasure, for example, the lighting device 60 (referred to as a standard device) of the user may be registered in the distribution server 40, and the distribution server 40 may distribute a signal obtained by converting the DMX signal of the stage lighting into the DMX signal of the standard device as the lighting signal. Processing of converting into the DMX signal of the standard device may be performed by the control device 50 instead of the distribution server 40.

The following modes may be considered as handling of the lighting signal included in the distribution information.
(1) A mode in which a signal is different from an image signal and a sound signal.
(2) A mode in which a lighting signal is embedded in a sound signal (or image signal).
(3) A mode in which a lighting signal identification ID or a URL is embedded in a sound signal (or image signal).

In the mode (1), a timing of the image signal and a timing of the lighting signal may be synchronized with each other by synchronizing the lighting signal with the image signal and the sound signal using a time code or the like, and the synchronized signals may be used. In the mode (2), it is not necessary to perform synchronization processing, and distribution information may be used directly, but when the lighting signal is to be corrected later, it is necessary to recreate a sound signal (or image signal). For example, the distribution server 40 may generate the distribution information in which the lighting signal corresponding to a lighting environment is embedded in the sound signal (or image signal) according to the environment of the lighting device 60 of the user. In the mode (3), a lighting signal corresponding to the embedded lighting signal identification ID is included in distribution information and distributed, or a lighting signal corresponding to the embedded URL is downloaded, so that the synchronized lighting signal can be used. According to the mode (3), even when the lighting signal is to be corrected later, it is not necessary to recreate a sound signal (or image signal). By applying the mode (3), not only the lighting signal but also meta information (for example, information of a live player) may be distributed in association with the lighting signal identification ID and the URL. In this case, the generation unit 532 may generate a lighting control signal or the state information 521 using the lighting signal included in each of the modes (1) to (3). In particular, when the lighting signal is embedded in the sound signal (or image signal) in the mode (2), for example, the generation unit 532 extracts the lighting signal embedded in the sound signal (or image signal) and generates a lighting control signal based on the extracted lighting signal.

In the above-described embodiment, a case where the lighting device 60 is controlled, and in the modification example thereof, a case where the virtual lighting is controlled have been described as examples, but the present invention is not limited thereto. In the image display system 1, both the lighting device 60 and the virtual lighting may be controlled. Both the lighting device 60 and the virtual lighting may be set to an ON state or an OFF state by an operation of the user.

When there are a plurality of speaker devices 80, sound output from each of the plurality of speaker devices 80 may be changed to express a sound field three-dimensionally. The sound field may be changed according to a viewpoint position of the user in the virtual space. When the speaker device 80 is a headphone, a three-dimensional sound field may be output by performing 3D sound processing using the headphone.

Controlling the light to be emitted by the lighting device 60 or the virtual lighting includes controlling an intensity, a color, a direction and an emission mode of the light to be emitted. The light emission mode is a mode of emitting light, and includes, for example, a mode of lighting, blinking, gradually brightening, gradually darkening and the like.

In the above-described embodiment, a case where the situation of the live performance is reproduced in real time has been described as an example, but the present invention is not limited thereto. The present invention can also be applied to a case where a video or the like in which a situation of a live performance is recorded is reproduced at a home of the user or the like.

In the above-described embodiment, a case where the lighting signal is the DMX signal for controlling the stage lighting has been described as an example, but the present invention is not limited thereto. The lighting signal may be a signal indicating illuminance or the like measured in the live venue P1.

The HMD may be used as the display device 70. In this case, the entire live venue in which the stage, the spectator seats, the virtual lighting and the like are provided is displayed on a screen of the HMD as the virtual space. Then, the control device 50 performs control according to the viewing position in the virtual space such that the entire virtual space moves integrally. That is, the control device 50 does not perform control such that only the virtual lighting moves alone while the virtual space is fixed. On the other hand, in a case of the physical display device 70 (real lighting) as described in the above-described embodiment, the display device 70 is fixedly arranged in the real world. Therefore, even when the virtual space moves, a position of the real lighting cannot be move. For example, when the virtual space moves and the real lighting is installed near a position where an image of the virtual lighting is displayed, the control device 50 performs control such that the real lighting located nearby and the virtual lighting move in conjunction with each other. Thereby, it is possible to create an effect as if the real lighting is moving in conjunction with the viewing position in the virtual space.

All or a part of the image display system 1 and the control device 50 according to the above-described embodiment may be implemented by a computer. In this case, a program for implementing this function may be recorded in a computer-readable recording medium, and the program recorded in the recording medium may be read and executed by a computer system. Here, the "computer system" includes an OS and hardware such as peripheral devices. The "computer-readable recording medium" refers to a portable medium such as a flexible disk, a magneto-optical disk, a ROM or a CD-ROM, or a storage device such as a hard disk built in the computer system. Further, the "computer-readable recording medium" may include a medium that dynamically holds a program for a short period of time, such as a communication line when the program is transmitted via a network such as the Internet or a communication line such as a telephone line, and a medium that holds a program for a certain period of time, such as a volatile memory in a computer system serving as a server or a client in that case. In addition, the program may be a program for implementing a part of the above-described function, may be a program capable of realizing the above-described function in combination with a program already recorded in the computer system, or may be a program realized using a programmable logic device such as an FPGA.

While certain embodiments have been described, these embodiments have been presented as examples and are not intended to limit the scope of the invention. These embodiments can be implemented in various other forms, and various omissions, substitutions and changes can be made without departing from the spirit of the invention. The accompanying claims and their equivalents are intended to cover such forms or modifications as would fall within the scope and spirit of the invention.

What is claimed is:

1. A computer-implemented display control method comprising:
    acquiring distribution information, the distribution information comprising image information indicating a target image and a lighting signal which is a signal for controlling a physical lighting device provided in a target space indicated in the target image;
    displaying a virtual space in which the target image corresponding to the image information is displayed;
    generating state information indicating a state of the target space based on, at least, the lighting signal in the distribution information; and
    controlling light to be emitted by a virtual lighting device provided in the virtual space based on the state information,
    wherein the virtual lighting device is arranged in the virtual space that is remote from the target space so as to correspond to an installation position of the physical lighting device, and the virtual lighting device is controlled in accordance with the lighting signal for the physical lighting device at the installation position corresponding to the virtual lighting device.

2. The computer-implemented display control method according to claim 1,
    wherein the lighting signal is separate from the target image.

3. The computer-implemented display control method according to claim 1,
    wherein the distribution information comprises a sound signal indicating sound collected in the target space, and
    wherein the lighting signal is embedded in the sound signal.

4. An image display system comprising:
    a processor; and
    a memory storing instructions that, when executed by the processor, cause the image display system to perform operations, the operations comprising:
    acquiring distribution information, the distribution information comprising image information indicating a target image and a lighting signal which is a signal for controlling a physical lighting device provided in a target space indicated in the target image;
    displaying a virtual space in which the target image corresponding to the image information is displayed;
    generating state information indicating a state of the target space based on, at least, the lighting signal in the distribution information; and
    controlling light to be emitted by a virtual lighting device provided in the virtual space based on the state information,
    wherein the virtual lighting device is arranged in the virtual space that is remote from the target space so as to correspond to an installation position of the physical lighting device, and the virtual lighting device is controlled in accordance with the lighting signal for the physical lighting device at the installation position corresponding to the virtual lighting device.

5. The image display system according to claim 4, wherein the operations further comprise:
    acquiring position information indicating a viewing position in the virtual space,
    wherein the light to be emitted by the virtual lighting device is controlled based on the position information.

6. The image display system according to claim 5,
    wherein the virtual space is displayed based on the position information.

7. The image display system according to claim 4,
    wherein the state information comprises information indicating a state of sound or light in the target space.

8. The image display system according to claim 7,
    wherein the state information further comprises information for controlling a lighting device provided in the target space.

9. The image display system according to claim 7,
    wherein the state information further comprises information for indicating a representative color representing a color of the target image.

10. The image display system according to claim 7,
    wherein the state information further comprises information for indicating a color corresponding to a frequency of sound collected in the target space.

11. The image display system according to claim 4, wherein the operations further comprise:
    acquiring sound information indicating sound collected in the target space; and controlling sound to be output from a speaker device based on the sound information.

12. The image display system according to claim 4, wherein the lighting signal is separate from the target image.

13. The image display system according to claim 4, wherein the distribution information comprises a sound signal indicating sound collected in the target space, and wherein the lighting signal is embedded in the sound signal.

\* \* \* \* \*